United States Patent
Ohki et al.

(10) Patent No.: US 10,167,214 B1
(45) Date of Patent: Jan. 1, 2019

(54) SYSTEM AND METHOD FOR GAS-DISPERSION-RETURN-SLUDGE-BASED WASTEWATER TREATMENT

(71) Applicants: Akiyoshi Ohki, Shirasato (JP); Kousuke Chiba, Mitaka (JP); Whitney Rich, Minato-ku (JP)

(72) Inventors: Akiyoshi Ohki, Shirasato (JP); Kousuke Chiba, Mitaka (JP); Whitney Rich, Minato-ku (JP)

(*) Notice: Subject to any disclaimer, the term of this patent is extended or adjusted under 35 U.S.C. 154(b) by 0 days.

(21) Appl. No.: 15/956,631

(22) Filed: Apr. 18, 2018

(51) Int. Cl.
| | |
|---|---|
| C02F 3/00 | (2006.01) |
| C02F 3/26 | (2006.01) |
| C02F 3/20 | (2006.01) |
| C02F 3/28 | (2006.01) |
| B01F 11/02 | (2006.01) |

(52) U.S. Cl.
CPC .............. *C02F 3/26* (2013.01); *B01F 11/02* (2013.01); *C02F 3/006* (2013.01); *C02F 3/20* (2013.01); *C02F 3/28* (2013.01); *B01F 2215/0052* (2013.01); *C02F 2201/782* (2013.01)

(58) Field of Classification Search
CPC .... C02F 3/006; C02F 3/20; C02F 3/26; C02F 3/28; C02F 2201/782; B01F 11/02; B01F 2215/0052
See application file for complete search history.

(56) References Cited

U.S. PATENT DOCUMENTS

| | | | |
|---|---|---|---|
| 7,105,092 B2 | 9/2006 | Chiba | |
| 7,534,351 B2 | 5/2009 | Chiba | |
| 2013/0140231 A1* | 6/2013 | Novak | C02F 3/301 210/603 |
| 2017/0113957 A1* | 4/2017 | Eckelberry | C02F 9/00 |
| 2017/0152168 A1* | 6/2017 | Cloete | C02F 3/121 |

\* cited by examiner

*Primary Examiner* — Terry K Cecil
(74) *Attorney, Agent, or Firm* — Patrick J. S. Inouye; Leonid Kisselev

(57) ABSTRACT

Control over the wastewater purification can be achieved through controlling delivery of gas-dispersion return sludge solely to an aerobic reaction vessel. The gas-dispersion return sludge is created using pure oxygen or oxygen containing trace amounts of ozone as a reactive gas, which is blended with return sludge to create a mixture of gas and liquid, which is pressurized with an atomizer pump, and then at a pressure of not more than approximately 5.5 MPa, the mixture is passed through an atomizer which uses cavitation or ultrasound at a frequency of less than 12,000 KHz to instantly render the reactive gas in the mixture to an ultra-fine bubble state. A portion of the gas is placed into a dissolved state, reaching a state of supersaturation with a high DO value of 20-40 mg/l, and causing the remaining ultra-fine bubbles to create an ultra-fine bubble condition.

20 Claims, 4 Drawing Sheets

10

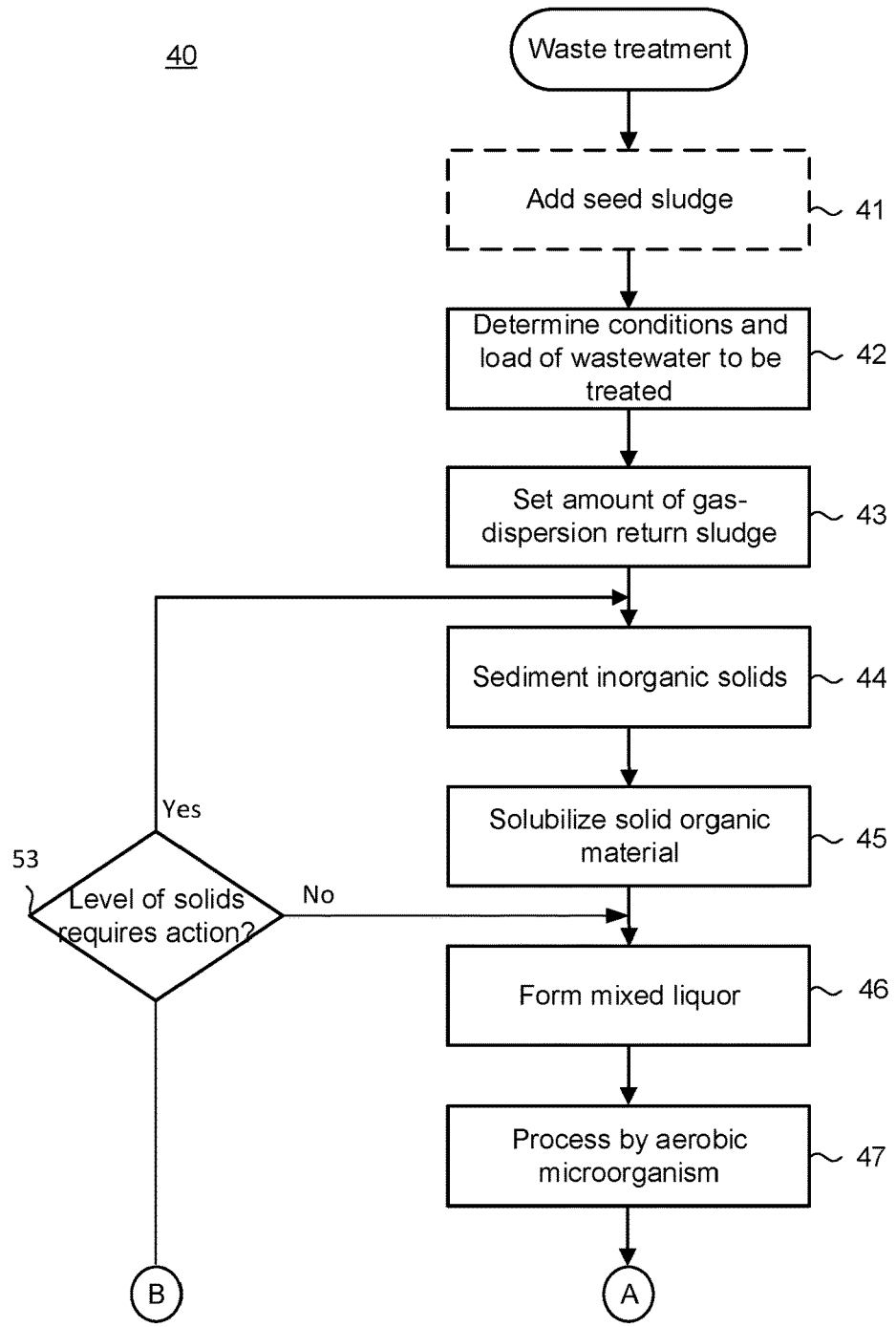

SYSTEM AND METHOD FOR GAS-DISPERSION-RETURN-SLUDGE-BASED WASTEWATER TREATMENT

FIELD

The present invention relates in general to wastewater purification, and in particular, to a system and method for gas-dispersion-return-sludge-based wastewater treatment.

BACKGROUND

The activated sludge process is a widely-practiced biochemical wastewater treatment and oxidation process that employs microorganisms and oxygen to immobilize dissolved organic pollutant substances in the wastewater as activated sludge, which is partly decomposed into water ($H_2O$) and carbon dioxide ($CO_2$) for removal.

Several challenges are associated with the traditional activated-sludge-based wastewater treatments. For instance, the biochemical cleansing of organic pollutant substances depends largely on the quantity of microorganisms (return sludge), the density of the microorganisms, and the degree of their activity.

However, to increase the quantity of microorganisms, their density, and their activity, increasing accordingly the supply of dissolved oxygen, which is essential to the microorganisms, is necessary. Without adequate supply of dissolved oxygen, the wastewater treatment may not be effective.

The importance of the dissolved oxygen can be seen from the following example. In the activated sludge method, 1BOD (Biological Oxygen Demand quantity, mg/l) of organic pollutant is defined as the amount of organic pollutant which requires 1DO (mg/l) of dissolved oxygen ($O_2$) to be broken down by microorganisms in a five-day period under normal atmospheric pressure at 20° C. Meanwhile, 1COD (Chemical Oxygen Demand quantity, mg/l) is defined similarly as the amount which requires 1DO (mg/l) of dissolved oxygen ($O_2$) to be broken down chemically in a 30-minute-to-two-hour period under normal atmospheric pressure at 20° C. Accordingly, in wastewater treatment under the standard activated sludge method, the cleansing capacity achieved per 1DO (dissolved oxygen, mg/l) is no greater than "1BOD (Biological Oxygen Demand quantity, mg/l) of pollutant". Meanwhile, in the same way, "1COD (Chemical Oxygen Demand quantity, mg/l) of pollutant" also requires 1DO (mg/l) of dissolved oxygen ($O_2$). In other words, to clean "1BOD of pollutant" and "1COD of pollutant" requires 2DO (mg/l) of dissolved oxygen. Without the sufficient amount of oxygen, the effectiveness of the activated sludge wastewater treatment is significantly limited.

Further, the cleansing of wastewater depends fundamentally on the activity of microorganisms (activated sludge), and is thus saddled with the problem of the formation of excess sludge due to the excessive reproduction of these microorganisms, and technology to control this excess has not yet adequately been realized. In other words, the microorganisms which are involved in the cleansing of wastewater are constantly reproducing themselves and then perishing due to self-oxidization, hence controlling and managing the amount of sludge produced and the amount destroyed is extremely difficult, and the lack of this control and management is considered the critical problem of the activated sludge method. As a result, the large quantities of excess sludge that form are concentrated, transported and incinerated or buried in landfills, causing massive processing costs for the removal of excess sludge and emissions problems from the release of carbon dioxide during incineration.

In addition, the control and management of the wastewater cleansing process in the activated sludge method involves numerous parameters which must be observed, with many observation items and observation frequencies, and requires the daily accumulation of a huge amount of data. Furthermore, controlling and managing the treatment capacity of the microorganisms which form the basis of the cleansing process is difficult, and even with the introduction of information technology, analyzing ever-more complicated data, deciding on countermeasures and instructing staff present a heavy burden for wastewater treatment plant managers.

Existing technologies fail to adequately address these challenges. For example, a technique known as preliminary aeration exists to enhance wastewater treatment capacity, in which the return sludge is aerated in advance, the sludge (microorganisms) is activated, and is pumped into the aeration vessel. However, the incremental capacity achieved by preliminary aeration is less than 30%. Because preliminary aeration has such low aeration efficiency, the cost is very high, such that preliminary aeration requires an additional 100% of the aeration cost. Due to the high cost to achieve an incremental capacity of only 30%, preliminary aeration is not cost-effective.

Similarly, another technique used today is long-term continuous aeration bubbling technology which uses bubbles of around 1 mm diameter, the quantity of dissolved oxygen merely reaches an unsaturated state of DO value 2 (mg/l), which is insufficient to bring about a large increase in microorganisms (return sludge).

Likewise, U.S. Pat. No. 7,105,092, issued Sep. 12, 2006, to Kousuke Chiba ("'092 patent"), the disclosure of which is incorporated by reference, discloses a sewage treatment process by which activated-sludge method comprising line atomizing treatment. Wastewater is introduced into the treatment line. The wastewater passes through the adjustment vessel and the sedimentation vessel where inorganic pollutant substances are removed. Subsequently, the wastewater enters the anaerobic reaction vessel where the wastewater is acted upon by anaerobic microorganisms. Subsequently, the wastewater enters the aerobic reactive vessel where organic matter within the wastewater is converted into activated sludge by the action of aerobic microorganisms. After the conversion process in the aerobic reaction vessel, the treated wastewater solution which has had the dissolved organic matter converted into activated sludge is sent together with the activated sludge to the sludge sedimentation vessel, and the supernatant water is expelled from the wastewater treatment system. The supernatant water may also be subjected to advanced treatment for further purification.

The '092 patent further discloses that a portion of the activated sludge which has settled in the sludge sedimentation vessel passes through the sludge intake pipe and is supplied respectively as return sludge to the adjustment vessel, sedimentation vessel, anaerobic reactive vessel, aerobic reactive vessel, and sludge sedimentation vessel to effect multiple functionality for each of those vessels, and to enhance the treatment capacity of the wastewater system while allowing the remainder of the activated sludge to undergo separate treatment as excess sludge. However, each vessel has an original function and role, and in many cases, adding activated return sludge which holds large quantities of reactive gases (oxygen or oxygen with trace amounts of ozone) may interfere with those functions or roles, thus decreasing the effectiveness of wastewater treatment.

Accordingly, there is a need for a way to increase control over activated sludge-based wastewater purification, including optimizing amount of oxygen available for the biochemical reaction during the purification.

SUMMARY

Control over the wastewater purification can be achieved through controlling delivery of gas-dispersion return sludge solely to an aerobic reaction vessel. The gas-dispersion return sludge is created using pure oxygen or oxygen containing trace amounts of ozone as a reactive gas, which is blended with return sludge to create a mixture of gas and liquid, which is pressurized with an atomizer pump, and then at a pressure of not more than approximately 5.5 MPa, the mixture is passed through an atomizer which uses cavitation or ultrasound at a frequency of less than 12,000 KHz to instantly render the reactive gas in the mixture to an ultra-fine (bubble diameter less than 30 μm) bubble state. A portion of the gas is placed into a dissolved state, reaching a state of supersaturation with a high DO value of 20-40 mg/l (dissolved oxygen value), and causing the remaining ultra-fine bubbles to create an ultra-fine bubble condition in the gas-dispersion return sludge.

This approach is particularly beneficial in that wastewater treatment capacity is dramatically increased, because gas-dispersion return sludge is supplied only to the aerobic reactive vessel (aeration vessel), and the amount of return sludge (microorganisms) can be raised freely to the optimal level.

Further, this approach is beneficial in that in addition to bringing about a dramatic increase in wastewater treatment capacity through activating the microorganisms within the gas-dispersion return sludge with reactive gas, the approach allows the effects of the increase in treatment capacity to be fixed and kept constant, by allowing the production and conditions of the gas-dispersion return sludge to be fixed.

Through the use of the gas-dispersion return sludge, simply by raising or lowering the key parameter of the treatment, which is the quantity of gas-dispersion return sludge, the entire wastewater treatment system can be controlled and managed. In particular, by supplying of gas-dispersion return sludge solely to the aerobic reactive vessel and by freely increasing the quantity of gas-dispersion return sludge (microorganisms) to the optimal quantity, the wastewater treatment capacity can be increased dramatically. With the exception of the agitation function, traditional aeration through bubbling becomes unnecessary, making possible a reduction in size of the aerobic reactive vessel.

Further, expressing clearly and precisely each processing cost item becomes possible: the degree of treatment of the wastewater, quantity of excess sludge production, and the treatment capacity of the entire system, thus minimizing the sum total of the wastewater treatment costs.

Further, by fixing the degree of activation of the microorganisms, which is the critical problem in the activated return sludge method, controlling and managing the activity level of the microorganisms and the quantity of the colonies becomes possible, that is, the quantity of gas-dispersion return sludge, such that the degree of freedom of control and management of the wastewater treatment system is increased, and control and management become easy and concise.

In addition, a synergistic effect occurs between the action of the microorganisms which have been activated by the reactive gases in the gas-dispersion return sludge and the supply of gas-dispersion return sludge having been increased to the optimal quantity, increasing the degree of cleansing of the wastewater and the wastewater treatment capacity.

Regarding the as yet unsolved critical problem of the activated sludge method (the large amounts of excess sludge generated), by maintaining activation with reactive gas (supersaturation with dissolved oxygen and/or trace amounts of ozone) at a sufficiently high level, simultaneously stimulating both the autonomous reproduction and the self-oxidation of the microorganisms (sludge) becomes possible. Further, by continuing the wastewater cleansing treatment process driven by the microorganisms (activated sludge) in a stable fashion for a set period of time, balancing the amount of sludge generated (quantity of autonomous reproduction) with the autonomous extinction of the sludge due to self-oxidation and stabilize the system becomes possible, such that by increasing and decreasing the quantity of return sludge, the production of excess sludge can be controlled and managed, and the quantity of return sludge generated can be reduced to a minimum ($\approx 0$).

Finally, as stated above, the system and method described simultaneously solve the problems of inefficient bubbling which attempts to use insoluble air as a reactive gas through continuous aeration over extended periods (involving large operating costs and large facility costs for aeration), the problem that treatment with microorganisms requires much time, and the problem that large quantities of excess sludge are generated, creating an enormous economic effect for the entire world. Further, as the centralization of population in the form of urbanization progresses rapidly on a global scale, the system and method can regenerate and revitalize as a low-cost, high-efficiency technology infrastructure for an energy-efficient city.

In one embodiment, a system for gas-dispersion-return sludge-based wastewater treatment is provided. The system includes: a sedimentation vessel into which wastewater including inorganic solids and solid organic materials is pumped and in which at least some of the inorganic solids sediments from the wastewater; an adjustment vessel into which the wastewater from the sedimentation vessel is pumped and which comprises anaerobic organisms that solubilize at least some of the solid organic materials within the wastewater; an aerobic reaction vessel into which the wastewater from the adjustment vessel is pumped and in which the wastewater pumped from the adjustment vessel mixes with a gas-dispersion return sludge to form a mixed liquor, the gas-dispersion return sludge comprising at least one reactive gas a portion of which is dissolved and a portion of which is in a state of ultra-fine bubbles, the gas-dispersion return sludge further comprising aerobic microorganisms that immobilize the solubilized organic materials within the mixed liquor as activated sludge using the at least one dissolved reactive gas, wherein at least some of the ultra-fine bubbles dissolve within the mixed liquor upon a consumption of the dissolved portion of the reactive gases by the aerobic microorganisms; a sludge sedimentation vessel into which the mixed liquor is pumped from the aerobic reaction vessel and in which the mixed liquor is separated into a supernatant and the activated sludge, wherein at least some of the activated sludge is pumped to an atomizer as a return sludge; a sludge collection vessel into which the activated sludge from the sludge sedimentation vessel is pumped, wherein at least some of the activated sludge from the sludge collection vessel is pumped to an atomizer as a return sludge; a gas generator configured to generate the at least one reactive gas; and the atomizer configured to form the gas-dispersion return sludge by rendering at least a portion of the at least one reactive gas generated by the gas generator into the ultra-fine bubbles within the return sludge, wherein a portion of the ultra-fine bubbles dissolves within the return sludge, and to pump the gas-dispersion return sludge solely into the aerobic reaction vessel. The system further includes a controller interfaced to the sludge storage vessel, the atomizer, and the gas generator, the controller configured to receive data comprising at least one of a desired degree of purification of the wastewater, a desired speed of purification of the wastewater, and an amount of the wastewater to be purified, and to control the amount of the gas-dispersion return sludge pumped into the aerobic reaction vessel based on the received data.

By standardizing the equipment and keeping the gas-dispersed return sludge reactive gas content fixed, the function and effect of the activated microorganisms remains constant and fixed which allows control of the waste water treatment process.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 2(A)-2(B) are flow diagrams showing a method for gas-dispersion-return-sludge-based wastewater treatment in accordance with one embodiment.

DETAILED DESCRIPTION

By using the quantity of gas-dispersion return sludge as a key parameter and delivering the gas-dispersion return sludge only to an aerobic reaction vessel, the system and method described below allow to easily and compactly unitarily control and manage the degree of wastewater treatment, the production quantity of excess sludge, and the wastewater treatment capacity. Further, by stabilizing the production of the gas-dispersion return sludge, the system and method described below allow to stabilize the activation effect of microorganisms within the gas-dispersion return sludge.

Figure 1:
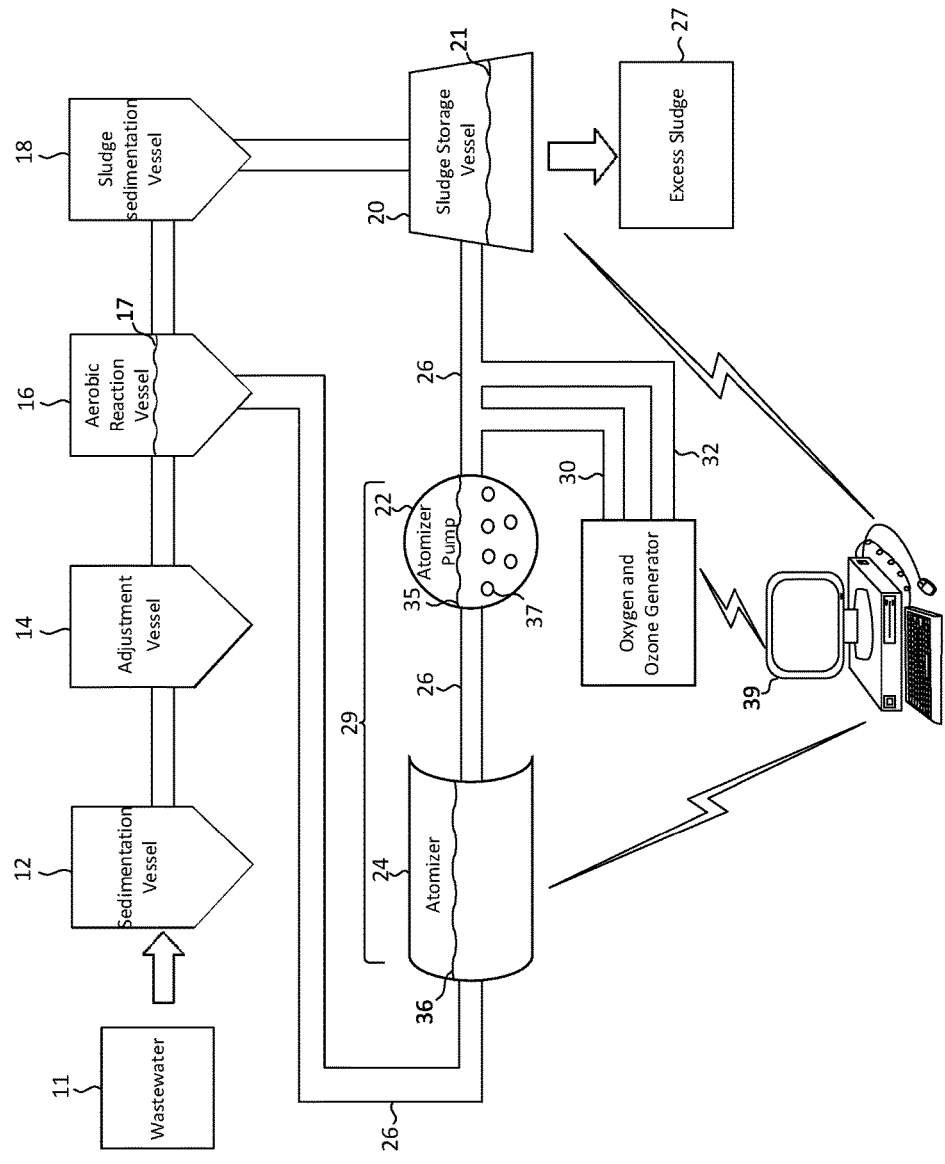
FIG. 1 is a block diagram showing a system for gas-dispersion-return-sludge-based wastewater treatment in accordance with one embodiment.

FIG. 1 is a block diagram showing a system 10 for gas-dispersion-return-sludge-based wastewater treatment in accordance with one embodiment.

The system includes as Sedimentation Vessel (also known as a sediment pool and a grit chamber) 12, an Adjustment Vessel 14, an Aerobic Reaction Vessel (also known as an aeration vessel) 16, a Sludge Sedimentation Vessel 18, a Sludge Storage Vessel 20, an Atomizer Pump 22, and an Atomizer 24.

In the description below, the phrase "Line Atomizer 29" is defined as the combination of the Atomizer Pump 22 and the Atomizer 24.

In further detail, the Line Atomizer 29 signifies the entire line of equipment which includes the Atomizer Pump 22, which has the function of pumping vapor-liquid (liquid infused with vapor) with a vapor-to-liquid ratio of up to 50% by volume at a pressure of approximately 0.981-5.394 MPa (1-55 kg/cm$^2$, and the Atomizer 24, which has the function of churning and mixing the aforementioned vapor-liquid under high pressure (approximately 0.981-5.394 MPa (1-55 kg/cm$^2$)), then employing either cavitation or 20-12,000 kHz ultrasound respectively or both simultaneously to induce ultra-fine bubbles in the vapor-liquid of diameter from 1 nm-30,000 nm, further causing oxygen radicalization and hydroxyl radicalization.

The Sludge Storage Vessel 20 and the Aerobic Reaction Vessel 16 are connected by the Return Sludge Pipeway 26, constructed such that return sludge which has settled in the Sludge Storage Vessel 20 can be supplied to the Aerobic Reaction Vessel 16. The Atomizer Pump 22 and the Atomizer 24 are positioned linearly along the Return Sludge Pipeway 26. Return Sludge 35 which travels through Return Sludge Pipeway 26 is therefore acted on by the Atomizer Pump 22 and the Atomizer 24 and becomes gas-dispersion return sludge 36, which is in turn supplied to the Aerobic Reaction Vessel 16 as gas-dispersion return sludge Z.

For the Atomizer Pump 22 and the Atomizer 24, the atomizer pump and atomizer in the U.S. Pat. No. 7,105,092 cited above, the disclosure of which is incorporated by reference, may be utilized. In a further embodiment, other kinds of Atomizer Pump 22 and Atomizer 24 are possible.

The system 10 further includes an Oxygen and Ozone Generator 28.

The Oxygen Supply Pipe 30 and the Ozone Supply Pipe 32 which are connected to the Oxygen and Ozone Generator 28 are connected to a pipe that is part of a Return Sludge Pipeway 26 and is in the upstream (intake) side of Atomizer Pump 22.

For the Oxygen and Ozone Generator 28, the oxygen and ozone generator in U.S. Pat. No. 7,105,092 may be utilized.

The Return Sludge Pipeway 26 is connected only to the Aerobic Reaction Vessel 16, and is therefore not connected to Sedimentation Vessel 12, Adjustment Vessel 14, and Sludge Sedimentation Vessel 18. The technological reason for this is discussed below.

Figure 2B:
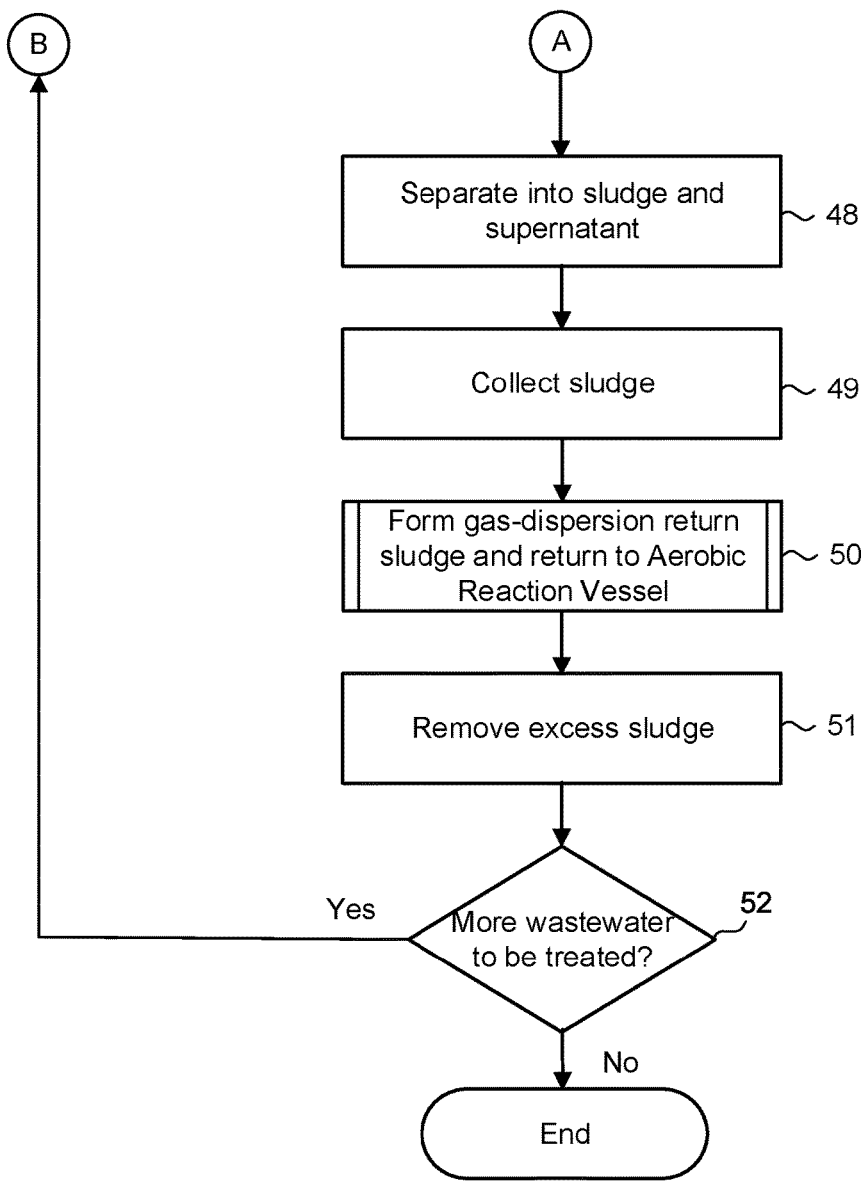

As further described below beginning with reference to FIGS. 2(A)-2(B), the Wastewater for Treatment (raw sewage) 11 enters Sedimentation Vessel 12 where grit and other inorganic solids settle and are separated out. From the Sedimentation Vessel 12, the Wastewater 11 flows into Adjustment Vessel 14 where the load and conditions of the inflowing raw sewage is adjusted, such as through automatic dilution, though other adjustments are possible, and organic solids present in the wastewater are solubilized by anaerobic microorganisms.

From the Adjustment Vessel 14, the Wastewater 11 flows into Aerobic Reaction Vessel 16 (aeration vessel), where gas-dispersion return sludge 36 is added to the Wastewater 11 and blended to form a mixed liquor 17. From there, aeration by bubbling using air as a reactive gas becomes unnecessary due to the reactive gas contained in gas-dispersion return sludge 36, which supplies dissolved oxygen (DO) to the Aerobic Reaction Vessel 16, and causes residual organic solids within the mixed liquor 17 left after the reaction involving the anaerobic microorganisms within the Adjustment Vessel 14 to be oxidized, and at the same time biochemical treatment by aerobic microorganisms occurs, the dissolved organic pollutant substances in the mixed liquor 17 are immobilized as activated sludge 21, and a portion of this activated sludge 21, is broken down to water ($H_2O$) and carbon dioxide ($CO_2$) and removed.

Next, the mixed liquor progresses to Sedimentation Vessel 18, settles inside Sedimentation Vessel 18 and is separated into sludge 21 and supernatant. The settled activated sludge is collected in Sludge Storage Vessel 20, and as described further below, is returned to Aerobic Reaction Vessel 16 in the form of gas-dispersion return sludge 36, for cyclical reuse.

Additionally, the excess sludge is pumped out of the wastewater management system as Excess Sludge 38.

The density of gas-dispersion return sludge 36 is maintained at a fixed level. Gas-dispersion return sludge 36 is returned solely to Aerobic Reaction Vessel 16, and is not returned to Sedimentation Vessel 12, Adjustment Vessel 14, or Sludge Sedimentation Vessel 18. The returned quantity of gas-dispersion return sludge 36 is unitarily controlled and unitarily managed to maximize the sum total reduction of carbon dioxide, the reduction in treatment costs, and the reduction in energy usage of the entire wastewater treatment system.

Because the wastewater treatment capacity of the Aerobic Reaction Vessel 16 is dramatically increased, the Aerobic Reaction Vessel 16 can be made very small.

The oxygen and ozone generated by the Oxygen and Ozone Generator 28 pass respectively through the Oxygen Supply Pipe 30 and the Ozone Supply Pipe 32, then into the intake of the Atomizer Pump 22, and are blended inside the Return Sludge Pipeway 26. Return Sludge 35 with gases mixed in is pumped by the Atomizer Pump 22, and when the Return Sludge 35 with gases mixed in passes through the Atomizer 24, the reactive gases are dissolved and stored in the return sludge instantaneously (within 0.5 seconds) to form gas-dispersion return sludge 36. After this, the mixture is supplied to the Aerobic Reaction Vessel 16 as gas-dispersion return sludge 36. The use of the supplied gas-dispersion return sludge 36 has been supplied to Aerobic Reaction Vessel 16 is as has been described above.

Further, the production of the Excess Sludge Y is ideally minimized (≈0). In doing so, the disposal cost of Excess Sludge Y can be greatly reduced.

As the Line Atomizer 29 can instantaneously render the desired quantity of reactive gas into ultra-fine bubbles, rapidly dissolving a portion of the reactive gas, then disperse, immobilize and store the excess in a liquid in the form of ultra-fine bubbles, the Line Atomizer 29 can create a liquid in which gas is dispersed, immobilized and stored (gas-infused liquid) which can be suitably returned or supplied to the aeration treatment process in an easily utilized dissolved state or ultra-fine bubble state.

Regarding the slowing effect on the velocity at which bubbles rise within a liquid which can be achieved by producing bubbles which are ultra-fine, bubbles with diameter of around 30 μm rise within a liquid at approximately 1 m/hr, and at a diameter of around 1 μm they rise at less than 0.005 m/hr (Stokes' Law for Spherical Bubbles). With this range of velocity, bubbles remain within the liquid for long enough that they can immediately and at the required position replace dissolved oxygen which has been consumed by the biochemical reaction with the pollutant substances in the wastewater to be treated, and furthermore, because the bubbles can be dispersed in ultra-fine bubble form, uniformly and in great quantity, and therefore in the same places where oxygen has been consumed, a bubble storage function is also achieved.

In this way, the desired reactive gases including oxygen or oxygen and ozone can be supplied and stored with extremely long duration, with neither surplus nor shortage, thereby shortening and stimulating the biochemical reaction, and also allowing that the supply within the time period required to carry out the biochemical reaction need not necessarily be continuous but can be intermittent.

As mentioned above, the Line Atomizer 29 is employed to disperse gas into liquid in the form of ultra-fine bubbles. To render bubbles to an ultra-fine size and blend the ultra-fine bubbles into liquid, mechanical agitation and cutting are insufficient to achieve the nano level, and only when the velocity of the two-phase flow of the vapor-liquid is increased through pressurization, and a synergistic effect with the vortex churning of the liquid is generated using cavitation and ultrasound, that the bubbles are broken down to ultra-fine state and blended into the mixture as ultra-fine bubbles. For the gas to be dissolved and remain in dissolved state, pressure conditions are of key importance, and higher pressures are known to be more advantageous. Taking all these factors into account, the range of pressure chosen for the Line Atomizer 29 is from 0.1 MPa- 5.394 MPa (1-55 $kg/cm^2$).

In a simple return process for activated sludge (with zero addition of reactive gas), operating in low pressure ranges to avoid destroying the microorganisms which exist in the activated sludge. Further, the reason to strive for the highest pressure that can be practically achieved (approximately 5.5 MPa), is to effectively utilize, in the oxidation and decomposition process of sludge employing reactive gas including high density ozone, a synergistic oxidation and decomposition effect between the actions of cavitation and ultrasound, which under high pressure cause the oxidation and breakdown of ozone itself, and the functioning of O radicals and OH radicals. With the large-capacity wastewater treatment employing the activated sludge method of the system 10, care has been taken to choose frequencies of ultrasound which can be used easily and economically, and so at low pressure ranges a frequency of 20 kHz was chosen, and for high pressure ranges (approximately 5.5 MPa) a frequency range of 12,000 kHz was chosen.

For the Oxygen and Ozone Generator 28, an ozone generator or similar may be used to regulate the supply of oxygen and the generation of ozone. For example, by employing an ozone-generating element comprising an electrode mounted to a dielectric substance, and a high-frequency high-voltage power source which applies a high-frequency alternating current to the ozone-generating element while supplying an oxygen-rich gas to the ozone-generating element, and adjusting the quantity of ozone generated by using a regulator to control the voltage and/or the frequency of the power source, it becomes possible to effect an oxygen/ozone cycle generator which regulates the amount of oxygen and ozone supplied, to cope with fluctuations in the quality and load of sewage for wastewater treatment due to morning, daytime or nighttime, or due to either dry weather or rainy weather, or to cope with processes based mainly on the supply of oxygen and with processes based mainly on oxidation and decomposition by ozone. For the reactive gas including oxygen to be supplied, air, oxygen-enriched air, or pure oxygen are all acceptable. The supplied gas may also be pumped as is, with zero ozone generation. Of course, the operation of the oxygen/ozone cycle generator may also be suspended.

In the activated sludge process, the microorganisms which effect the biochemical reaction are returned to the wastewater intake side with a portion of the sludge (return sludge) such that the microorganisms are utilized cyclically. If the wastewater 11 to be treated is wastewater 11 which includes high densities of organic substances, and accelerating the microbial biochemical reaction is therefore necessary, then maximizing the quantity of oxygen dissolved in the wastewater 11 or replenishing dissolved oxygen rapidly according to the amount of dissolved oxygen which is consumed is desirable. The system 10 performs favorably in this respect, employing the Line Atomizer 29 to infuse with the required amount of oxygen gas (or oxygen with the trace of ozone) the water which carries the return sludge back to Aerobic Reaction Vessel 16. The microbial biochemical reaction is accelerated dramatically due to the Line Atomizer 29 supplying a plentiful amount of oxygen (or oxygen with a trace of ozone) in a dissolved state and in the form of ultra-fine bubbles in an extremely short time.

Because ultra-fine bubbles, as previously described, require a very long time to float to the surface of Aerobic Reaction Vessel 16, during the time which it takes them to float to the surface of Aerobic Reaction Vessel 16, the ultra-fine bubbles in Aerobic Reaction Vessel 16 are dispersed and stored in the form of ultra-fine bubbles, and continuously replenish the dissolved oxygen. By maintaining a high quantity of dissolved oxygen in Aerobic Reaction Vessel 16, significant acceleration of the microbial biochemical reaction becomes possible. Due to the effect of the microbial biochemical reaction within Aerobic Reaction Vessel 16, a portion of the organic matter in the wastewater is digested, releasing carbon dioxide and water, and a portion of the organic matter is consumed by activated sludge microorganisms; the microorganisms multiply, and the activated sludge is generated. In this case, by adding not only oxygen to the wastewater, but by also adding and employing trace amounts (e.g. up to 0.01-0.4 mg/l=ppm) of ozone, activating the microorganisms which carry out the microbial biochemical reaction becomes possible.

The amount of gas-dispersion return sludge 36 that is provided by the Line Atomizer 29 into the Aerobic Reaction Vessel 16 is a key parameter for controlling the purification of the wastewater 11 treatment. In particular, the following characteristics of the wastewater treatment can be directly controlled and managed through increasing or decreasing the gas-dispersion return sludge:
1) Degree of wastewater treatment: the degree of treatment can be heightened by increasing the amount of gas-dispersion return sludge (quantity of reactive gas and microorganisms);
2) Wastewater treatment time: the treatment time can be shortened by increasing the amount of gas-dispersion return sludge (quantity of microorganisms); and
3) Wastewater treatment capacity: the capacity can be increased by increasing the amount of gas-dispersion return sludge (quantity of microorganisms).

As the properties of the gas-dispersion return sludge 36 are fixed by the functional limitations of the equipment employed, their activation capacity (activation effect) becomes fixed and is not a parameter. In more detail, oxygen or oxygen with trace amounts of ozone is used as a reactive gas, it is blended into the return sludge which is sent to Atomizer Pump (liquid-vapor pressuring pump) 22, and by passing through Atomizer 24, a portion of the reactive gas is instantaneously dissolved into the return sludge 35 and the remainder is stored in the form of ultra-fine bubbles creating "gas-dispersion sludge". This gas-dispersion sludge contains dissolved oxygen DO in super-saturated state (DO value 20-40 mg/l) and in particular trace amounts of ozone (0.01-0.4 mg/l). For this reason, the gas-dispersion return sludge maintains a state of extremely high activation, and the microorganisms within the gas-dispersion return sludge are further activated by the high activation properties of the reactive gas. In this way, the gas-dispersion return sludge is employed such that its properties and function are fixed, so effect of the gas-dispersion return sludge 36 is also fixed. In other words, the effect becomes a constant rather than a variable and can therefore be excluded from the control items.

In one embodiment, the components of the system 10 described above can be controlled independently of each other. In a further embodiment, the system 10 includes a Controller 39 that is interfaced, such as via a wired or a wireless connections, to at least the Sludge Sedimentation Vessel 20, the Oxygen and Ozone generator 28, and the Line Atomizer 29. The Controller 39 can also be similarly interfaced to other components of the system 39. The Controller 39 can receive from a user the amount of gas-dispersion return sludge 36 that is to be delivered to the Aerobic Reaction Vessel 16 and control the Sludge Sedimentation Vessel, the Oxygen and Ozone Generator 28, and the Line Atomizer 29 to deliver the desired amount of the gas-dispersion return sludge 36. Alternatively, the controller 39 can receive from a user a characteristic of the wastewater treatment, such as a degree of the wastewater treatment desired by the user, a wastewater treatment time desired by the user, and a desired wastewater treatment capacity, and determine the amount of the gas-dispersion return sludge 36 to be delivered to the Aerobic Reaction Vessel 16 to achieve the desired characteristic. The determined amount can then be delivered under the control of the Controller 39. The Controller 39 can be a computing device, such as a personal computer, a smartphone, a laptop, a tablet, though other kinds of computing devices are possible. The Controller 39 can include components conventionally found in general purpose programmable computing devices, such as a central processing unit, memory, input/output ports, network interfaces, and non-volatile storage, although other components are possible. The central processing unit can implement computer-executable code which can be implemented as modules. The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

The Controller 39 can be controlled by a user on-site or remotely. For example, the Controller 39 can be interfaced to an Internetwork, such as the Internet or a cellular network, and a user device (such as a smartphone though other user devices are possible) also interfaced allows to command the Controller 39 remotely, and provides remote control of the system 10 to a user.

Other kinds of the Controller 39 are also possible.

When the system 10 has not recently been ran, there may not always gas-dispersion return sludge 36 available to be added to the Aerobic Reaction Vessel 36 and provide the aerobic microorganisms necessary to conduct the aerobic reaction to the Aerobic Reaction Vessel. In such a situation, the system 10 may utilize seed sludge—activated sludge 21 that is input into the system 10, such as into the Return Sludge Pipeway 26, from an external source, such as another wastewater treatment system, though other external sources are possible. By being processed by the Line Atomizer 29 and the Oxygen and Ozone Generator 28, the seed sludge is turned into the gas-dispersion return sludge 36 and can then be provided to the Aerobic Reaction Vessel 16 to be used for the treatment of the wastewater 11. As the microorganisms present in activated sludge 21 differ significantly based on the geographic origin of the wastewater 11 from which the sludge 21 is created, the seed sludge introduced into the system 10 is selected based on the geographic location of the wastewater from 21 from the seed sludge originates. Preferably, the seed sludge is from the same or proximate geographic location as the wastewater 11 being processed by the system 10 to avoid an introduction of exogenous microorganisms that can negatively impact the aerobic reaction.

While the description above references the system 10 including a single Aerobic Reaction Vessel 16, in a further embodiment, multiple Aerobic Reaction Vessels 16 can be included in the system 10, with the gas-dispersion return sludge 36 being provided into all of the Vessels 16.

As described above, providing the gas-dispersion return sludge 36 allows to exercise increased control over the wastewater purification. FIGS. 2(A)-2(B) are flow diagrams showing a method 40 for gas-dispersion-return-sludge-based wastewater treatment in accordance with one embodiment. The method can be implemented using the system 10 of FIG. 1. Optionally, if no gas-dispersion return sludge 36 is present in the Aerobic Reaction Vessel at the start of the execution of the method 40, seed sludge is added to the system 10, is converted into gas-dispersion return sludge 36, and is provided into the Aerobic Reaction Vessel, as described above with reference to FIG. 1 (step 41). The load of wastewater 11 to be treated is determined (step 42) and the amount of gas-dispersion return sludge 36 to be delivered to the Aerobic Reaction Vessel 16 is determined (step 43). The determination can be done based on the load as well as other desired characteristics of the wastewater treatment, such as the degree of the purification and the speed of the treatment, though other characteristics are possible.

The wastewater 11 enters Sedimentation Vessel 12 where grit and other inorganic solids settle and are separated out (step 44). Subsequently, the wastewater 11 enters Adjustment Vessel 14 where the load and conditions of raw sewage 11 are adjusted and solid organic material is solubilized by anaerobic microorganisms (step 45).

Next, the wastewater 11 flows into one or more Aerobic Reaction Vessels 16, where the wastewater 11 (raw sewage) is added to gas-dispersion return sludge 36 and blended to form mixed liquor 17 (step 46). From there, if any aeration by bubbling using air as a reactive gas was previously performed, such aeration becomes unnecessary due to the reactive gas contained in gas-dispersion return sludge 36. Dissolved oxygen (DO) is supplied to the Vessel 16 by the gas-dispersion return sludge 36 and organic solids left undissolved after step 45 are oxidized; at the same time biochemical treatment by aerobic microorganisms occurs, with the organic pollutant substances dissolved in the in the wastewater 11 being immobilized as activated sludge 21, and a portion of this activated sludge 21 is broken down to water ($H_2O$) and carbon dioxide ($CO_2$) and removed (step 47).

Next, the mixed liquor 17 progresses to Sedimentation Vessel 18, settles inside Sedimentation Vessel 18 and is separated into sludge and supernatant (step 48). The settled activated sludge is collected in Sludge Storage Vessel 20 (step 49), and is returned to Aerobic Reaction Vessel 16 in the form of gas-dispersion return sludge 36, for cyclical reuse (step 50), as further described below with reference to FIG. 3. Excess sludge 27 is expelled from the Sludge Collection Vessel and from the system 10 (step 51). If more wastewater 11 to be treated remains (step 52), whether the amount of solid pollutants, organic and inorganic, in the next batch of wastewater 11 to be treated requires action via execution of steps 44 and 45 is determined (step 53). The determination can be made by comparing the level of the solids to one or more thresholds, though other kinds of determinations are possible. If the level requires action (step 53), the method returns to step 44. If the level does not require action, the method 40 returns to step 46. If the no more wastewater 11 remains to be processed (step 52), the method 40 ends.

Figure 3:
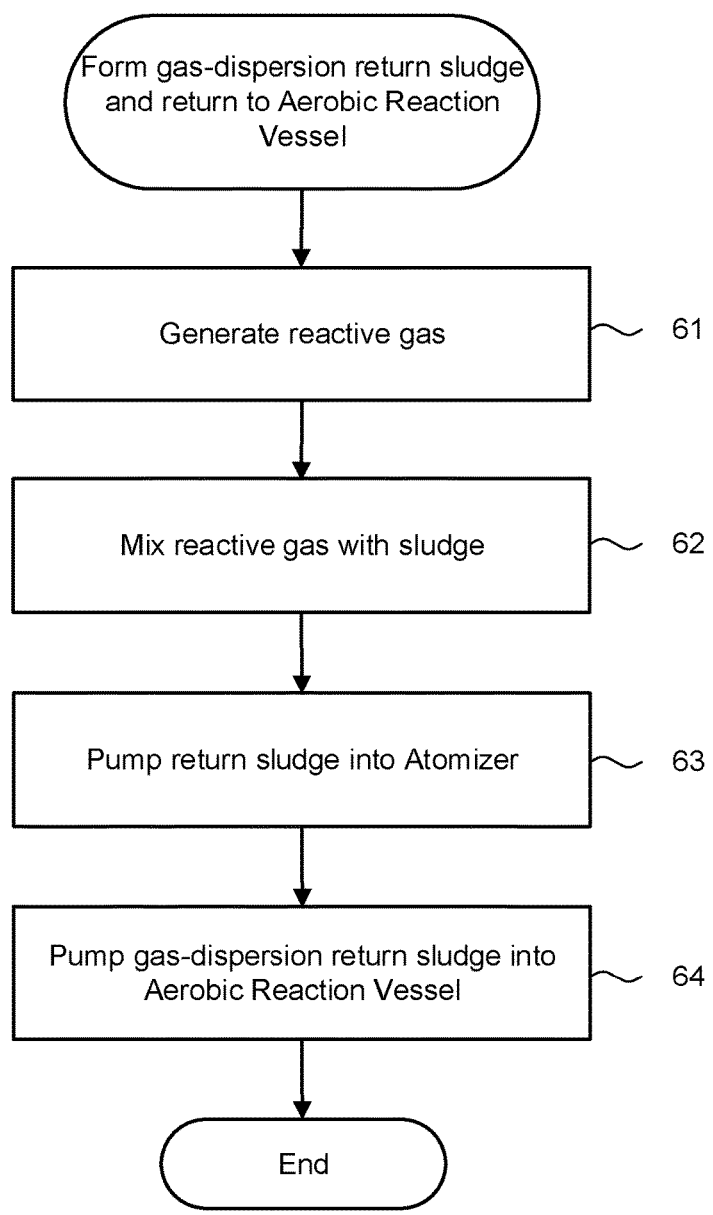
FIG. 3 is a flow diagram showing a routine for forming gas-dispersion return sludge and returning the gas-dispersion return sludge to the aerobic reaction vessel for use in the method of FIGS. 2(A)-2(B) in accordance with one embodiment.

Providing the gas-dispersion return sludge 36 solely into the Aerobic Reaction Vessel 16 allows to achieve an optimum quantity of the aerobic microorganisms within the Aerobic Reaction Vessel 16. FIG. 3 is a flow diagram showing a routine for forming gas-dispersion return sludge and returning the gas-dispersion return sludge 36 to the aerobic reaction vessel for use in the method of FIGS. 2(A)-2(B) in accordance with one embodiment.

Reactive gas, pure oxygen or oxygen containing trace amounts (0.01-0.4 mg/l) of ozone, is generated by the Oxygen and Ozone Generator 28 (step 61). As described above, the Atomizer Pump 22 and the Atomizer 24 are installed along the Return Sludge Pipeway 26, and the reactive gas is introduced into the intake side of Atomizer Pump 22 and the return sludge 35 is converted into a gas-liquid mixed liquor (step 62). This gas-liquid mixed liquor (sludge) is pumped by the Atomizer Pump 22 and in passing through the Atomizer 24, the reactive gas within the gas-liquid mixed liquor (gas-dispersion sludge) is instantaneously (within 0.5 seconds) rendered into ultra-fine bubbles (bubble diameter less than 30 µm, ideally bubble diameter less than 1 µm) and a portion of it is instantly dissolved (step 63). With this, a super-saturated DO value of 20-40 mg/l is realized, and the remaining gas is dispersed, immobilized and stored within the sludge in an ultra-fine bubble state.

This gas-dispersion return sludge containing reactive gas is supplied by the Atomizer only to the one or more Aerobic Reaction Vessels 16, where is blended with wastewater 11 to be treated, forming a mixed liquor (step 64), ending the routine 60.

As mentioned above, upon addition of the gas-dispersion return sludge to one or more of the Reaction Vessels that point, any bubbling in the Aerobic Reaction Vessel 16 can be ceased. Or, in cases where the bubbling is required to prevent the settling of sludge, bubbling aeration can be minimal and may be conducted intermittently and for short periods of time. As a result, the holding period in Aerobic Reaction Vessel 16 can be reduced to a fraction equal to 1 divided by the number of Aerobic Reaction Vessels 16. In other words, if there are four Aerobic Reaction Vessels 16, the holding period would be reduced to ¼ of the current holding period. Three of the four Aerobic Reaction Vessels 16 will no longer be required.

Further, by increasing the amount of return sludge, the rate of reaction is increased and enhanced, and the holding period within the aerobic reaction vessel can be reduced even further. The microorganisms are activated by the reactive gas contained within the return sludge, and due to the synergistic effect of increasing the quantity of gas-dispersion return sludge, purification capacity is increased by a multiple of around 25-40.

Furthermore, through the activation of the microorganisms (sludge), both the autonomous reproductive function and the self-oxidation function can be made more active. By continuing the wastewater purification process of the microorganisms (activated sludge) in a stable fashion for a set period of time, the production of sludge (autonomous reproduction) and the extinction of sludge due to self-oxidation can be held in balance and maintained regularly and constantly.

Through the control and management of the above wastewater purification system, taking the returned quantity of gas-dispersion return sludge 36 as the Key Parameter, since the parameter is constructed in a comprehensively simple and compact fashion, identifying and clarifying the reduction in carbon dioxide, the reduction in treatment cost, and the improvement in energy savings of the entire wastewater treatment system becomes simple.

Further, if a wastewater treatment facility (e.g. a sewage treatment plant) using the system 10 and method 40 for wastewater purification were to be newly constructed, the Sedimentation Vessel 12, an anaerobic reaction vessel (which also doubles as Adjustment Vessel 14), and the Aerobic Reaction Vessel 16 may all be built as one unit. The volume of Aerobic Reaction Vessel 16 may be decided based on a standard holding period of about two hours. However, since the quantity of gas-dispersion return sludge 36 can be selected freely depending upon the load and conditions of the wastewater 11 to be treated (raw sewage) within the range of 20-300% of the volume of the wastewater 11, when calculating the volume of wastewater 1 adding in the amount of gas-dispersion return sludge 36 to be returned is necessary. Also, the volume of Sludge Sedimentation Vessel 18 should be determined in the same way as Aerobic Reaction Vessel 16.

In the system 10 and method 40, the conditions and load of wastewater to be treated are determined and fixed. So, by fixing the microorganism density of the gas-dispersion return sludge 36, controlling and managing the wastewater treatment process solely by increasing or decreasing the quantity of gas-dispersion return sludge 36 returned to Aerobic Reaction Vessel 16. In other words, to achieve the ideal quantity of gas-dispersion return sludge 36 for the load and conditions of the entering wastewater, the quantity of gas-dispersion return sludge 36 can be increased or decreased freely within the range of 20-300% of the volume of the wastewater 11. By increasing or decreasing the amount of the return sludge 36 added to the Aerobic Reaction Vessel 16, an almost complete purification of the Wastewater can be achieved, with almost zero of the undesired pollutants being present following the purification.

Further, the more the quantity of gas-dispersion return sludge 36 is increased, the greater the degree of purification and the higher the treatment capacity will be. However, if a greater than necessary quantity of gas-dispersion return sludge 36 is used, the treatment cost will also rise. Therefore, the ideal quantity of gas-dispersion return sludge 36 is identified and clarified to match the desired degree of wastewater treatment.

Theoretically, the more the quantity of gas-dispersion return sludge 36 is increased, the greater the degree of purification and the higher the treatment capacity will be. However, if a greater than necessary quantity of gas-dispersion return sludge 36 is used, the treatment cost will also rise. Therefore, if the quantity of gas-dispersion return sludge 36 is gradually raised until the desired degree of wastewater treatment is achieved, the minimum requisite quantity of gas-dispersion return sludge 36 can be identified and clarified.

At first, the quantity of gas-dispersion return sludge 36 is maintained at a set level, and regular continuous operation should be carried out over a set period (around 4-6 weeks) to stabilize the wastewater treatment system. At that time, the quantity of sludge generated is observed. Once the wastewater treatment system has stabilized, the quantity of gas-dispersion return sludge 36 is increased or decreased, the change in sludge production is ascertained, and the quantity of returned sludge is adjusted to minimize sludge production. By maintaining the quantity of return sludge that minimizes sludge production is maintained, and continuing operation to stabilize the treatment system, the quantity of sludge generated and the quantity of sludge returned can be balanced and the production of excess sludge can be suppressed and controlled.

Thus, maximizing the reduction in wastewater treatment cost becomes possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for gas-dispersion-return sludge-based wastewater treatment, comprising:
   a sedimentation vessel into which wastewater comprising inorganic solids and solid organic materials is pumped and in which at least some of the inorganic solids settle from the wastewater;
   an adjustment vessel into which the wastewater from the sedimentation vessel is pumped and which comprises anaerobic organisms that solubilize at least some of the solid organic materials within the wastewater;
   an aerobic reaction vessel into which the wastewater from the adjustment vessel is pumped and in which the wastewater pumped from the adjustment vessel mixes with a gas-dispersion return sludge to form a mixed liquor, the gas-dispersion return sludge comprising at least one reactive gas a portion of which is dissolved and a portion of which is in a state of ultra-fine bubbles, the gas-dispersion return sludge further comprising aerobic microorganisms that immobilize the solubilized organic materials within the mixed liquor as activated sludge using the at least one dissolved reactive gas, wherein at least some of the ultra-fine bubbles dissolve within the mixed liquor upon a consumption of the dissolved portion of the reactive gases by the aerobic microorganisms;
   a sludge sedimentation vessel into which the mixed liquor is pumped from the aerobic reaction vessel and in which the mixed liquor is separated into a supernatant and the activated sludge;
   a sludge storage vessel into which the activated sludge from the sludge sedimentation vessel is pumped, wherein at least some of the activated sludge from the sludge collection vessel is pumped to a line atomizer as a return sludge;

a gas generator configured to generate the at least one reactive gas;

the line atomizer configured to form the gas-dispersion return sludge by rendering at least a portion of the at least one reactive gas generated by the gas generator into the ultra-fine bubbles within the return sludge, wherein a portion of the ultra-fine bubbles dissolves within the return sludge, the line atomizer further configured to pump the gas-dispersion return sludge solely into the aerobic reaction vessel; and a controller interfaced to the sludge storage vessel, the line atomizer, and the gas generator, the controller configured to receive data comprising at least one of a desired degree of purification of the wastewater, a desired speed of purification of the wastewater, and an amount of the wastewater to be purified, and to control the amount of the gas-dispersion return sludge pumped into the aerobic reaction vessel based on the received data.

2. A system according to claim 1, wherein at least some of the activated sludge in the sludge storage vessel is not provided to the line atomizer and is expelled from the sludge storage vessel.

3. A system according to claim 1, wherein the at least one reactive gas comprises oxygen.

4. A system according to claim 1, wherein the at least one reactive gas comprises oxygen and ozone.

5. A system according to claim 4, wherein the gas-dispersion return sludge comprises 0.01-0.4 mg/l of the ozone and 20-40 mg/l of the oxygen.

6. A system according to claim 4, wherein the reactive gas generator comprises an ozone-generating element comprising an electrode mounted to a dielectric substance, and a high-frequency high-voltage power source which applies a high-frequency alternating current to the ozone-generating element while supplying an oxygen-rich gas to the ozone-generating element.

7. A system according to claim 1, further comprising:
seed sludge comprising further activated sludge originating from a source other than the immobilization of the solubilized organic materials within the mixed liquor, wherein the line atomizer renders the seed sludge into gas-dispersion return sludge.

8. A system according to claim 7,
wherein the source is geographically proximate to a source of the wastewater.

9. A system according to claim 8, wherein the amount of the activated sludge is between 20% and 300% of a volume of the wastewater.

10. A system according to claim 1, further comprising:
the adjustment vessel further configured to adjust conditions and a load of the wastewater.

11. A system according to claim 1, further comprising:
one or more pipes connecting the sludge storage vessel to an atomizer pump through which the activated sludge is pumped to the atomizer pump, wherein the reactive gas generator pumps the at least one reactive gas into at least one of the pipes and the at least one pumped reactive gas mixes with the activated sludge within the at least one pipe; and the atomizer pump configured to pump the return sludge mixed with the at least one reactive gas to an atomizer.

12. A system according to claim 11, wherein the atomizer pump pumps the return sludge mixed with the at least one reactive gas under the pressure of 0.981 MPa to 5.394 MPa.

13. A system according to claim 11, wherein the at least one reactive gas comprises oxygen and ozone which are independently piped to the activated sludge.

14. A system according to claim 1, wherein the ultra-fine bubbles are of a diameter less than 30 μm.

15. A system according to claim 1, further comprising:
the line atomizer further configured to churn and mix the return sludge and the at least one reactive gas under a high pressure, and to apply at least one of a cavitation and ultrasound to the mixture to induce a formation of the ultra-fine bubbles.

16. A system according to claim 15, wherein the high pressure is between 0.981 MPa and 5.394 MPa.

17. A system according to claim 15, wherein the ultrasound is between 20 kHz and 12,000 kHz.

18. A system according to claim 1, wherein a portion of the activated sludge within the aerobic reaction vessel is broken down into water and carbon dioxide.

19. A system according to claim 1, wherein aeration bubbling is not conducted within the aerobic reaction vessel.

20. A system according to claim 1, wherein intermittent aeration bubbling is conducted within the aerobic reaction vessel.

* * * * *